M. H. PRESCOTT.

Heels for Boots and Shoes.

No. 6,052.

Reissued Sept. 15, 1874.

Witnesses,

Chas H. Smith

Harold Sewell

Inventor

Mark H. Prescott per Lemuel W. Serrell atty.

THE GRAPHIC CO. PHOTO-LITH. 39 & 41 PARK PLACE, N.Y.

UNITED STATES PATENT OFFICE.

MARK H. PRESCOTT, OF OTTAWA, ILLINOIS.

IMPROVEMENT IN HEELS FOR BOOTS AND SHOES.

Specification forming part of Letters Patent No. 90,192, dated May 18, 1869; reissue No. 6,052, dated September 15, 1874; application filed June 23, 1874.

*To all whom it may concern:*

Be it known that I, MARK H. PRESCOTT, of Ottawa, in the county of La Salle and State of Illinois, have invented an Improvement in Heels for Boots and Shoes; and the following is declared to be a full and correct description of the same.

This invention relates to a metallic heel for boots and shoes; and consists in a hollow or box heel with an inward flange at the upper end, in combination with a plate attached to the heel portion of the boot or shoe, so that the metallic heel is secured by slipping the flange of the heel above the edges of said plate, and between that and the boot or shoe at the heel, and the parts are retained by screws passing through the heel; but the heel can be removed for repairs or otherwise after the screws are taken out.

Figure 1:
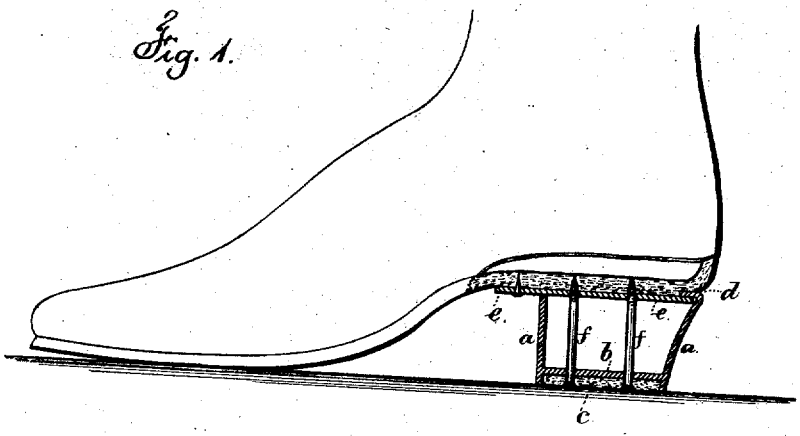
Figure 2:
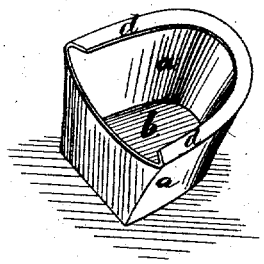
Figure 3:
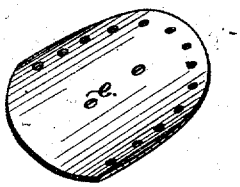

In the drawing, Figure 1 represents a sectional elevation of my improved heel as applied to a shoe. Fig. 2 is a perspective view of the metallic portion of the heel, and Fig. 3 represents the plate by which the heel is secured to the shoe.

*a* represents the metallic body of the heel, preferably formed of sheet metal, and made hollow, with the bottom *b* slightly above the bottom of the sides, and forming a recess for the insertion of a piece of sole-leather or other substance, *c*. The upper part of the body *a* is provided with a flange, turned inward, as represented at *d*, and so formed that the said part *a* may be slipped upon the plate *e* from behind after the said plate is secured to the insole, as represented in Fig. 1.

The said flange *d* may be turned down flat, and merely take above the edge of the plate *e*, or it may have an upward incline, and also take over the edge of the insole, the latter being beveled for the purpose.

The plate *e* may be secured to the insole by sewing or pegging through the holes therein, as preferred; and holes are provided in it for the screws *f*, by which the part *a* is prevented from slipping backward after being connected by the said flange.

This arrangement forms a cheap and durable construction, and facilitates the removal of the body *a* of the heel, for repairs or for other purposes, by simply removing the screws *f*.

I claim as my invention—

1. The hollow heel *a*, having an inward flange, *d*, in combination with the plate *e*, attached to the boot or shoe at the heel, as and for the purposes specified.

2. A metallic heel made hollow, and having an inward flange around the upper and outer portion, and with the front portion of the heel removed sufficiently to allow the heel to be slipped into place from the rear, in combination with the metallic plate attached to the boot or shoe, substantially as set forth.

Signed by me this 15th day of June, A. D. 1874.

MARK H. PRESCOTT.

Witnesses: EDWARD L. ARMSTRONG, AARON B. SMITH.